United States Patent
Wu et al.

(10) Patent No.: US 10,164,461 B2
(45) Date of Patent: Dec. 25, 2018

(54) WIRELESS CHARGING DEVICE, SYSTEM, AND METHOD BASED ON BACK COVER MOBILE POWER SUPPLY

(71) Applicant: JRD COMMUNICATION (SHENZHEN) LTD, Shenzhen, Guangdong (CN)

(72) Inventors: Zewei Wu, Guangdong (CN); Hongjie Tong, Guangdong (CN); Zhiming Diao, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 15/740,347

(22) PCT Filed: Mar. 28, 2017

(86) PCT No.: PCT/CN2017/078410
§ 371 (c)(1),
(2) Date: Dec. 28, 2017

(87) PCT Pub. No.: WO2018/054028
PCT Pub. Date: Mar. 29, 2018

(65) Prior Publication Data
US 2018/0331558 A1 Nov. 15, 2018

(30) Foreign Application Priority Data
Sep. 26, 2016 (CN) .......................... 2016 1 0849782

(51) Int. Cl.
*H04B 1/38* (2015.01)
*H02J 7/02* (2016.01)
(Continued)

(52) U.S. Cl.
CPC ............ *H02J 7/025* (2013.01); *H02J 7/0013* (2013.01); *H04B 5/0075* (2013.01)

(58) Field of Classification Search
CPC ........ H02J 7/025; H02J 7/0013; H04B 5/0075
(Continued)

(56) References Cited

U.S. PATENT DOCUMENTS 6,719,445 B2 * 4/2004 Nagakura .............. B60Q 1/007
362/546
8,369,905 B2 * 2/2013 Sogabe ................ H04B 5/0093
307/104
(Continued)

FOREIGN PATENT DOCUMENTS

| CN | 103166279 A | 6/2013 |
| CN | 104253468 A | 12/2014 |

(Continued)

OTHER PUBLICATIONS

International Search Report on corresponding PCT application (PCT/CN2017/078410) from International Searching Authority (CN) dated Jun. 5, 2017.

*Primary Examiner* — Edward F Urban
*Assistant Examiner* — Max Mathew

(57) ABSTRACT

The present disclosure discloses a wireless charging device, system, and method based on a back cover mobile power supply. The wireless charging system includes a wireless charger, a back cover mobile power supply, and an intelligent terminal. The intelligent terminal is provided with a main battery and a wireless charging device. A built-in induction coil is powered and generates an electromagnetic field when a wireless charger is powered on. The back cover mobile power supply inducts the electromagnetic field and generates a current to the wireless charging device. The intelligent terminal and the back cover mobile power supply are controlled to enter a charging state, and a charging current is transmitted to the main battery of the intelligent terminal and the back cover mobile power supply, respec- (Continued)

tively, so as to perform charging, when the current is detected by the wireless charging device.

18 Claims, 3 Drawing Sheets

(51) Int. Cl.
    *H02J 7/00*     (2006.01)
    *H04B 5/00*     (2006.01)
(58) Field of Classification Search
    USPC .......................................... 455/573; 345/1.1
    See application file for complete search history.

(56) References Cited

U.S. PATENT DOCUMENTS

| | | | |
|---|---|---|---|
| 8,508,144 B2* | 8/2013 | Han | H02M 1/126 |
| | | | 315/224 |
| 9,728,022 B2* | 8/2017 | Gengler | G07C 9/00174 |
| 2013/0127687 A1* | 5/2013 | Yu | H01M 10/44 |
| | | | 345/1.1 |
| 2015/0364946 A1* | 12/2015 | Wang | H02J 7/0047 |
| | | | 455/573 |
| 2016/0134142 A1* | 5/2016 | Murphy | H02J 7/0054 |
| | | | 455/573 |

FOREIGN PATENT DOCUMENTS

| | | |
|---|---|---|
| CN | 204908346 U | 12/2015 |
| CN | 106451614 A | 2/2017 |
| JP | 2015226399 A | 12/2015 |

* cited by examiner

WIRELESS CHARGING DEVICE, SYSTEM, AND METHOD BASED ON BACK COVER MOBILE POWER SUPPLY

CROSS-REFERENCE TO RELATED APPLICATIONS

The present application is a 35 U.S.C. § 371 National Phase conversion of International (PCT) Patent Application No. PCT/CN2017/078410 filed Mar. 28, 2017, which claims foreign priority of Chinese Patent Application No. 201610849782.5, filed on Sep. 26, 2016 in the State Intellectual Property Office of China, the contents of all of which are hereby incorporated by reference.

TECHNICAL FIELD

Embodiments of the present disclosure generally relate to charging technology, and in particular relate to a wireless charging device, system, and method based on a back cover mobile power supply.

BACKGROUND

Wireless charging technology (by means of electromagnetic induction) is becoming mature, and will be the mainstream means of charging intelligent terminals in the future. A back cover mobile power supply (in the case of a mobile phone, the back cover mobile power supply looks similar to the phone's back cover, which usually has an output current interface disposed in the bottom) has a built-in back battery and a control circuit. The back cover mobile power supply is covered on a back surface of the intelligent terminal, and an output current interface directly inserted into a USB interface at a bottom of the intelligent terminal. A power switch on the back cover mobile power supply can be pressed to control charging the intelligent terminal without a data cable and affecting the use of the intelligent terminal.

However, the back cover mobile power supply also needs to be powered so as to charge, and the back battery can charge the intelligent terminal after it is fully charged. The user can merely charge the back cover mobile power supply or the intelligent terminal alone, however the back cover mobile power supply and the intelligent terminal cannot be charged at the same time, which has low charging efficiency.

Therefore, there is room for improvement and development.

SUMMARY

In view of the above deficiencies of the prior art, an objective of the present disclosure to provide a wireless charging device, system, and method based on a back cover mobile power supply, with the aim at resolving the problem of low charging efficiency since the back cover mobile power supply and the intelligent terminal of the prior art cannot be charged at the same time.

A technical scheme adopted by the present disclosure to resolve the technical problem is as follows.

A wireless charging method based on a back cover mobile power supply, including:

powering on a wireless charger, such that a built-in induction coil is powered and generates an electromagnetic field;

inducting the electromagnetic field and generating a current to a wireless charging device through the back cover mobile power supply;

controlling an intelligent terminal and the back cover mobile power supply to enter a charging state when the current is detected by the wireless charging device; transmitting a charging current to a main battery of the intelligent terminal and the back cover mobile power supply, respectively, so as to perform charging;

controlling the intelligent terminal and the back cover mobile power supply to enter a power supply state, and connecting the main battery of the intelligent terminal and the back cover mobile power supply such that the back cover mobile power supply supplies power to the main battery, when no current is detected by the wireless charging device; and controlling the wireless charging device to enter a single charging mode such that the wireless charging device charges the main battery according to a charging voltage output by the back cover mobile power supply when the back cover mobile power supply detects a power switch key of the back cover mobile power supply being pressed.

Another technical scheme adopted by the present disclosure to resolve the technical problem is as follows.

A wireless charging device based on a back cover mobile power supply; the wireless charging device is coupled with a main battery and a back cover mobile power supply, and includes a power switching circuit, a microcontroller unit ("MCU"), a first charging circuit, a second charging circuit, and a switch circuit;

The power switching circuit controls the MCU to enter a double charging mode or a power supply mode according to an input state of a charging current transmitted by the back cover mobile power supply; the MCU controls the switch circuit to be disconnected in the double charging mode and controls the first charging circuit and the second charging circuit to charge a power core and the main battery, respectively; and the MCU switches on the switch circuit in the power supply mode, and the switch circuit connects the back cover mobile power supply and the main battery such that the back cover mobile power supply supplies power to the main battery.

Still another technical scheme adopted by the present disclosure to resolve the technical problem is as follows.

A wireless charging system based on a back cover mobile power supply, which includes a wireless charger, a back cover mobile power supply, and an intelligent terminal;

the intelligent terminal is provided with a main battery and the wireless charging device;

a built-in induction coil is powered and generates an electromagnetic field when the wireless charger is powered on; the back cover mobile power supply inducts the electromagnetic field and generates a current to a wireless charging device; the intelligent terminal and the back cover mobile power supply are controlled to enter a charging state, and a charging current is transmitted to the main battery of the intelligent terminal and the back cover mobile power supply, respectively, so as to perform charging, when the current is detected by the wireless charging device.

Compared with the prior art, in the wireless charging device, system, and method based on a back cover mobile power supply provided by the present disclosure, the wireless charging system includes a wireless charger, a back cover mobile power supply, and an intelligent terminal. The intelligent terminal is provided with a main battery and a wireless charging device. A built-in induction coil is powered and generates an electromagnetic field when a wireless charger is powered on. The back cover mobile power supply inducts the electromagnetic field and generates a current to the wireless charging device. The intelligent terminal and the back cover mobile power supply are controlled to enter a charging state, and a charging current is transmitted to the main battery of the intelligent terminal and the back cover mobile power supply, respectively, so as to perform charging, when the current is detected by the wireless charging device. As a result, when performing wireless charging, the intelligent terminal and the back cover mobile power supply can be charged at the same time so as to improve the charging efficiency, which resolves the problem of low charging efficiency since the back cover mobile power supply and the intelligent terminal of the prior art cannot be charged at the same time.

DETAILED DESCRIPTION

The present disclosure provides a wireless charging device and system as well as a method thereof based on a back cover mobile power supply. The wireless charging (by means of electromagnetic induction) technology based on an intelligent terminal realizes a one-to-many charging scheme by using a power switching module, which enables a main battery of the intelligent terminal and the back cover mobile power supply to be charged at the same time efficiently and safely. When the charging is not enabled, the back cover power supply can provide power to the main battery. In order to make the objective, technical scheme, and the advantage of the present disclosure more clear and definite, the present disclosure will now be described in more detail with reference to the accompanying drawings as follows. It is to be understood that the specific embodiments described herein are merely illustrative of the present disclosure and are not intended to limit the present disclosure.

Figure 1:
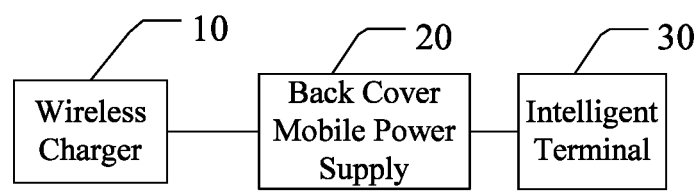
FIG. 1 is a block diagram of a wireless charging system according to an embodiment of the present disclosure.
Figure 2:
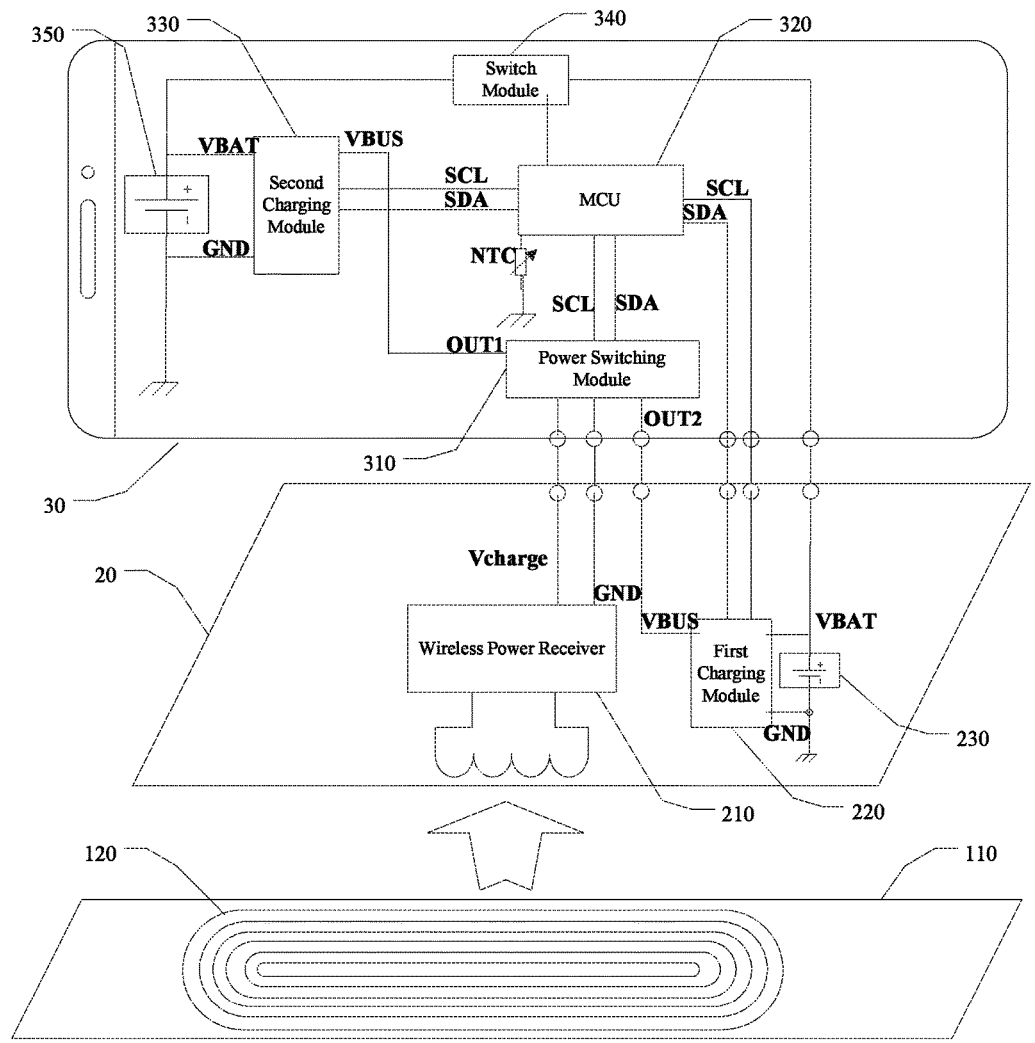
FIG. 2 is a schematic diagram of a circuit principle of a wireless charging system according to an embodiment of the present disclosure.

Referring to FIG. 1 and FIG. 2, a wireless charging system based on a back cover mobile power supply, which is provided by the present disclosure, includes a wireless charger 10, a back cover mobile power supply 20, and an intelligent terminal 30. A wireless charging device 300 is disposed in the intelligent terminal 30. The back cover mobile power supply 20 is covered on a back surface of the intelligent terminal 30, and a back surface of the back cover mobile power supply 20 is placed in an induction coil region of the wireless charger 10. When the wireless charger 10 is plugged with a power, a 220V AC power is converted into a 5V DC power to power a coil board 110 (i.e., a transmission circuit with an induction coil), and an induction coil 120 is powered to generate an electromagnetic effect and an electromagnetic field outwardly. According to the principle of electromagnetic induction, the back cover mobile power supply 20 inducts the electromagnetic field and generates a current to the wireless charging device 300. When the current is detected by the wireless charging device 300, the wireless charging device 300 controls the intelligent terminal 30 and the back cover power supply 20 to enter a charging state, and a charging current Vcharge is outputted to transmit to a main battery 350 of the intelligent terminal 30 and a power core 230 of the back cover power supply 20, respectively. As a result, the main battery 350 of the intelligent terminal 30 and the back cover mobile power supply 20 can be charged at the same time, which improves the charging efficiency.

In this embodiment, the back cover mobile power supply 20 includes a wireless power receiver 210, a first charging module 220, and a power core 230. The specific connection relationship is shown in FIG. 2. The wireless power receiver 210 generates the current according to the inducted electromagnetic field, and outputs the charging current Vcharge after performing rectification and filtering on the current. The first charging module 220 controls a charging and discharging state of the power core 230 according to a signal output by the wireless charging device 300.

When no current is detected by the wireless charging device 300, the intelligent terminal 30 and the back cover mobile power supply 20 are controlled to enter a power supply state, and the main battery 350 of the intelligent terminal 30 and the power core 230 of the back cover mobile power supply 20 are connected such that the power core 230 supplies power to the main battery 350.

The wireless charging device 300 includes a power switching module 310, an MCU 320, a second charging module 330, and a switch module 340. The specific connection relationship is shown in FIG. 2. The power switching module 310 controls the MCU 320 to enter a double charging mode or a power supply mode according to an input state of the charging current Vcharge transmitted by the back cover mobile power supply 20. The MCU 320 controls the first charging module 220 and the second charging module 330 to charge the power core 230 and the main battery 350, respectively, in the double charging mode. The MCU 320 switches on the switch module 340 in the power supply mode, and the switch circuit connects the power core 230 and the main battery 350 to supply power. In one embodiment, the wireless power supply receiver 210 may use BQ51020 (model) of TI (Texas Instruments). The switch module 340 is composed of a MOS tube and a peripheral circuit.

In a further embodiment, the wireless charging device 300 further includes a thermistor NTC. The thermistor NTC is connected to the MCU 320 so as to realize temperature control. As a result, the MCU 320 may further switch the charging by itself according to the temperature environment so as to, for example, charge the main battery 350 or the power core 230 alone. If the charging is to be stopped, the corresponding output terminal is controlled to stop outputting a charging voltage VBUS, and the corresponding charging module is controlled to stop. Similarly, the control method for starting to charge can be obtained.

With reference to FIG. 2, the operation principle of the wireless charging system is as follows.

First, the back cover mobile power supply 20 and the intelligent terminal 30 are charged at the same time.

At this time, the wireless charger 10 is connected to a general power. An induction coil of the wireless power receiver 210 inducts the electromagnetic field and generates the current. After the wireless power receiver 210 performs rectification and filtering on the current, the electric energy is converted into a DC power, and the charging current Vcharge is outputted to the power switching module 310 of the wireless charging device 300.

The power switching module 310 is used to realize the switching of charging. When the charging current Vcharge is detected to have been inputted, the power switching module 310 communicates with the MCU 320 through an I2C bus (SCL and SDA), and outputs a double charging signal to control the MCU 320 to enter the double charging mode. The charge voltage VBUS is outputted to the first charging module 220 and the second charging module 330, respectively. The power switching module 310 has two output terminals (OUT1 and OUT2, which output the same charging voltage VBUS). At this time, the corresponding charging module has not been enabled, and will not charge.

The MCU 320 controls the switch module 340 to disconnect, such that the power core 230 and the main battery 350 are disconnected. The MCU 320 further communicates with the first charging module 220 and the second charging module 330 through the I2C bus (SCL and SDA) and outputs two enable signals to control the first charging module 220 and the second charging module 330 to operate. The first charging module 220 and the second charging module 330 charge the power supply 230 and the main battery 350, respectively, according to the inputted charging voltage VBUS. As a result, the charging of the intelligent terminal and the back cover mobile power supply at the same time can be realized.

In one embodiment, the first charging module 220 and the second charging module 330 may be composed of a BQ24158 (model) charging chip of TI (Texas Instruments) and a peripheral circuit, which have the functions of the over-charge and over-discharge protection, the over-voltage and over-current protection of the input and output, the short circuit protection, etc. The MCU 320 is a microcontroller configured to control the entire charging process, which can use MT6755 (model) of MTK (MediaTek).

Second, the back cover mobile power supply 20 supplies power to the intelligent terminal 30.

At the time, the power switching circuit 310 detects that there is no charge current Vcharge being inputted, and outputs a power supply signal through the I2C bus (SCL and SDA) to control the MCU 320 to enter the power supply mode. The MCU 320 switches on the switching module 340, and the switch circuit connects the power core 230 and the main battery 350 so as to implement a function that the back cover mobile power supply 20 supplies power to the intelligent terminal alone. At the time, it is not in the charging mode, the power core 230 is used as the main battery 350, and the main power supply is changed from the original main battery 350 to the power core 230.

Third, the back cover mobile power supply 20 charges the intelligent terminal 30.

The back cover mobile power supply 20 further includes a control module which implements the function of charging the intelligent terminal 30 through the back cover mobile power supply 20, i.e., when a power switch on the back cover mobile power supply 20 is detected to have been pressed, the function of charging the intelligent terminal 30 through the back cover power supply 20 is performed. This embodiment mainly explains how the charging is performed after the power switching module 310 is added, while the control module outputs a switching signal to the power switching module 310 so as to communicate a first output terminal OUT1 with a second output terminal OUT2 of the power switching module 310.

The power switching module 310 controls the MCU 320 to enter a single charging mode by outputting a single charging signal through the I2C bus (SCL and SDA). The MCU 320 controls the switch module 340 to be disconnected, such that the power core 230 and the main battery 350 are disconnected. The MCU 320 further controls the first charging module 220 to obtain the charging voltage VBUS of the power core 230 and transmit to the power switching module 310 by outputting a discharge signal through the I2C bus (SCL and SDA), and outputs a charging signal to control the second charging module 330 to operate through the I2C bus.

The power switching module 310 outputs the charging voltage VBUS to the second charging module 330 through the first output terminal OUT1, and the second charging module 330 charges the main battery 350 according to the charging voltage VBUS.

Figure 3:
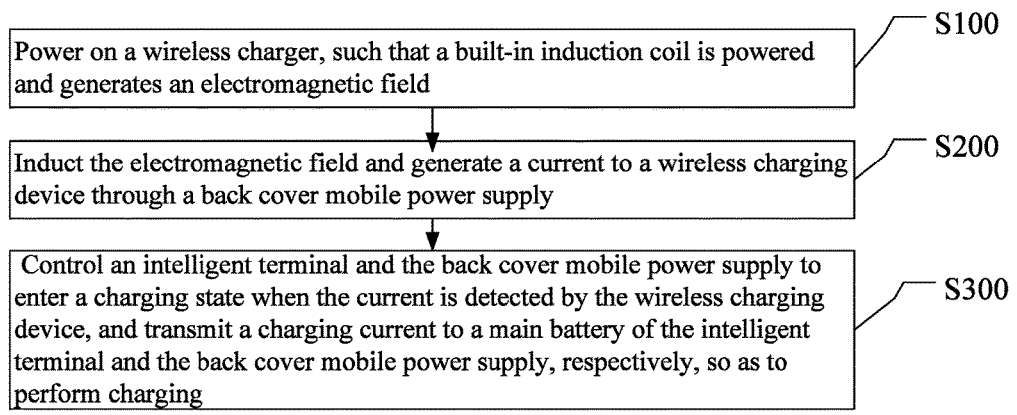
FIG. 3 is a flow chart of a wireless charging method of a wireless charging system according to an embodiment of the present disclosure.

The present disclosure further provides a wireless charging method based on the above-mentioned wireless charging system. Referring to FIG. 3, a flow chart of a wireless charging method of a wireless charging system according to an embodiment of the present disclosure is depicted. The method may include the following blocks.

At S100: powering on a wireless charger, such that a built-in induction coil is powered and generates an electromagnetic field;

At S200: inducting the electromagnetic field and generating a current to a wireless charging device through a back cover mobile power supply;

At S300: controlling an intelligent terminal and the back cover mobile power supply to enter a charging state when the current is detected by the wireless charging device; transmitting a charging current to a main battery of the intelligent terminal and the back cover mobile power supply, respectively, so as to perform charging.

When no current is detected by the wireless charging device, the intelligent terminal and the back cover mobile power supply are controlled to enter a power supply state, and the main battery of the intelligent terminal and the back cover mobile power supply are connected such that the back cover mobile power supply supplies power to the main battery.

When the back cover mobile power supply detects that a power switch key of the back cover mobile power supply is pressed, the wireless charging device is controlled to enter a single charging mode such that the wireless charging device charges the main battery according to a charging voltage output by the back cover mobile power supply.

In view of the above, the present disclosure realizes a one-to-many charging scheme by the switching of the power switching module, which can charge the main battery and the back cover mobile power supply of the intelligent terminal at the same time, and enables the back cover mobile power supply to supply power the main power supply (at this time, the back cover mobile power supply is used as the main battery), while the existing functions are maintained. The function of charging the intelligent terminal through the back cover mobile power supply is capable of saving the design cost of the main board of the intelligent terminal, while improves the charging efficiency and the battery life. In addition, multiple levels of charging security are also provided to ensure the safety in the charging process.

It is to be understood that the application of the present disclosure is not limited to the above-mentioned examples. For those skilled in the art, it is possible to improve or modify in accordance with the above descriptions, and all such improvements and modifications should be within the scope of the claims appended hereto.

What is claimed is:

1. A wireless charging method, comprising:
powering on a wireless charger, such that a built-in induction coil is powered and generates an electromagnetic field;

inducting the electromagnetic field and generating a current to a wireless charging device through a back cover mobile power supply;

controlling an intelligent terminal and the back cover mobile power supply to enter a charging state when the current is detected by the wireless charging device; transmitting a charging current to a main battery of the intelligent terminal and the back cover mobile power supply, respectively, so as to perform charging;

controlling the intelligent terminal and the back cover mobile power supply to enter a power supply state, and connecting the main battery of the intelligent terminal and the back cover mobile power supply such that the back cover mobile power supply supplies power to the main battery, when no current is detected by the wireless charging device; and controlling the wireless charging device to enter a single charging mode such that the wireless charging device charges the main battery according to a charging voltage output by the back cover mobile power supply when the back cover mobile power supply detects a power switch key of the back cover mobile power supply being pressed;

wherein the wireless charging device comprises a power switching circuit, an MCU, a second charging circuit, and a switch circuit; the power switching circuit controls the MCU to enter a double charging mode or a power supply mode according to an input state of the charging current transmitted by the back cover mobile power supply; the MCU controls the switch circuit to be disconnected in the double charging mode and controls a first charging circuit of the back cover mobile power supply and the second charging circuit to charge a power core of the back cover mobile power supply and the main battery of the intelligent terminal, respectively; and the MCU controls the switch circuit to become conducted in the power supply mode, connecting the back cover mobile power supply and the main battery such that the back cover mobile power supply supplies power to the main battery.

2. The method of claim 1, further comprising: controlling the MCU to enter the single charging mode according to a switching signal transmitted by the back cover mobile power supply through the power switching circuit;

controlling the switch circuit to disconnect and controlling the second charging circuit to operate through the MCU; and obtaining the charging voltage from the back cover mobile power supply and outputting the charging voltage to the second charging circuit using the power switching circuit through the MCU, and charging the main battery according to the charging voltage through the second charging circuit.

3. The method of claim 1, wherein the back cover mobile power supply comprises a wireless power receiver, the first charging circuit, and the power core, and the method further comprises:

generating the current according to the induced electromagnetic field and outputting the charging current after performing rectification and filtering on the current through the wireless power receiver; and controlling a charging and discharging state of the power core according to a signal output by the wireless charging device through the first charging circuit.

4. The method of claim 2, wherein the MCU communicates the power switching circuit, the second charging circuit, and the back cover mobile power supply through an I2C bus.

5. A wireless charging device, wherein the wireless charging device is arranged in an intelligent terminal and coupled with a main battery of the intelligent terminal and a back cover mobile power supply; the wireless charging device comprises a power switching circuit, an MCU, a second charging circuit, and a switch circuit;

the power switching circuit controls the MCU to enter a double charging mode or a power supply mode according to an input state of a charging current transmitted by the back cover mobile power supply; the MCU controls the switch circuit to be disconnected in the double charging mode and controls a first charging circuit of the back cover mobile power supply and the second charging circuit to charge a power core of the back cover mobile power supply and the main battery of the intelligent terminal, respectively; and the MCU controls the switch circuit to become conducted in the power supply mode, connecting the back cover mobile power supply and the main battery such that the back cover mobile power supply supplies power to the main battery.

6. The device of claim 5, the power switching circuit further controls the MCU to enter the single charging mode according to a switching signal transmitted by the back cover mobile power supply;

the MCU controls the switch circuit to disconnect and controls the second charging circuit to operate; the MCU obtains a charging voltage from the back cover mobile power supply and outputs the charging voltage to the second charging circuit using the power switching circuit, and the second charging circuit charging the main battery according to the charging voltage.

7. The device of claim 5, wherein the MCU communicates the power switching circuit, the second charging circuit, and the back cover mobile power supply through an I2C bus.

8. The device of claim 5, wherein the power switching circuit comprises two output terminals such that the first output terminal and the second output terminal, and the two output terminals output the same charging voltage.

9. The device of claim 5, wherein the switch circuit comprises MOS tubes and an external circuit.

10. The device of claim 5, wherein the MCU switches charge according to the temperature environment.

11. The device of claim 5, further comprising a thermistor, wherein the thermistor connects to the MCU for temperature control.

12. The device of claim 5, wherein the second charging circuit comprises a charging chip and a peripheral circuit.

13. A wireless charging system, wherein the wireless charging system comprises a wireless charger, a back cover mobile power supply, and an intelligent terminal;

the intelligent terminal is provided with a main battery and a wireless charging device, wherein the wireless charging device is arranged in the intelligent terminal and coupled with the main battery of the intelligent terminal and the back cover mobile power supply; the wireless charging device comprises a power switching circuit, an MCU, a second charging circuit, and a switch circuit; the power switching circuit controls the MCU to enter a double charging mode or a power supply mode according to an input state of a charging current transmitted by the back cover mobile power supply; the MCU controls the switch circuit to be disconnected in the double charging mode and controls a first charging circuit of the back cover mobile power supply and the second charging circuit to charge a power core of the back cover mobile power supply and the main battery of the intelligent terminal, respectively; and the MCU controls the switch circuit to become conducted in the power supply mode, connecting the back cover mobile power supply and the main battery such that the back cover mobile power supply supplies power to the main battery;

a built-in induction coil of the wireless charger is powered and generates an electromagnetic field when the wireless charger is powered on; the back cover mobile power supply inducts the electromagnetic field and generates a current to the wireless charging device; the intelligent terminal and the back cover mobile power supply are controlled to enter a charging state, and a charging current is transmitted to the main battery of the intelligent terminal and the back cover mobile power supply, respectively, so as to perform charging, when the current is detected by the wireless charging device.

14. The system of claim 13, wherein the back cover mobile power supply comprises a wireless power receiver, the first charging circuit, and the power core;

the wireless power receiver is configured to generate the current according to the inducted electromagnetic field and output the charging current after performing rectification and filtering on the current; and the first charging circuit is configured to control a charging and discharging state of the power core according to a signal output by the wireless charging device.

15. The system of claim 14, wherein the intelligent terminal and the back cover mobile power supply are controlled to enter a power supply state, and the main battery of the intelligent terminal and the power core of the back cover mobile power supply are connected such that the power core supplies power to the main battery, when no current is detected by the wireless charging device.

16. The system of claim 14, wherein the back cover mobile power supply further comprises a control circuit, the control circuit controls the wireless charging device to enter a single charging mode such that the wireless charging device charges the main battery according to a charging voltage output by the back cover mobile power supply when the control circuit detects a power switch key of the back cover mobile power supply being pressed.

17. The system of claim 14, wherein the first charging circuit comprises a charging chip and a peripheral circuit.

18. The system of claim 16, wherein the control circuit outputs a switching signal to the power switching circuit to connect the first output terminal and the second output terminal.

* * * * *